(No Model.)
J. E. BRAZEE.
WIRE STRINGER AND STRETCHER.
No. 511,232. Patented Dec. 19, 1893.
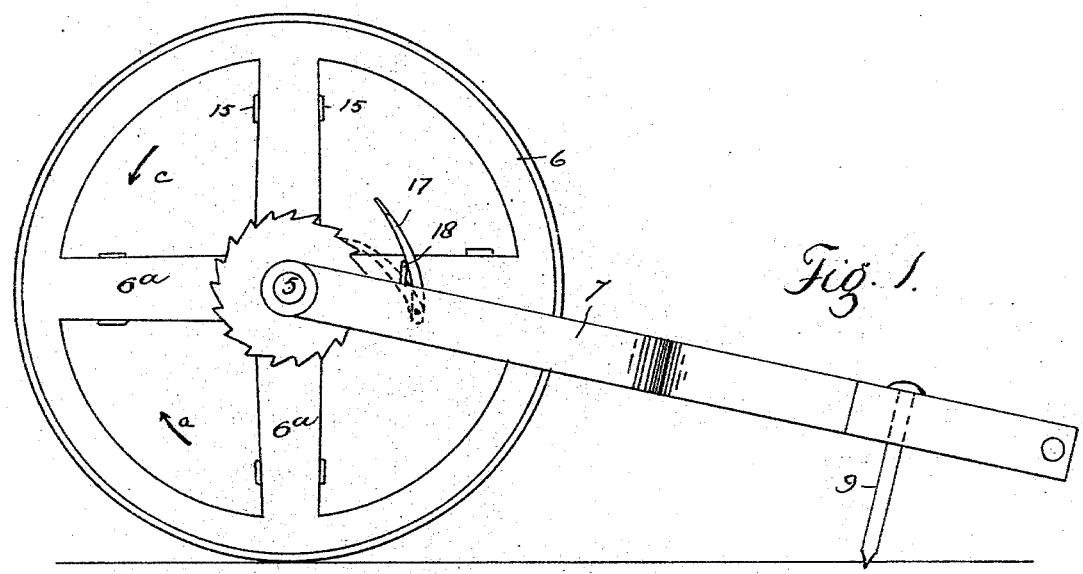
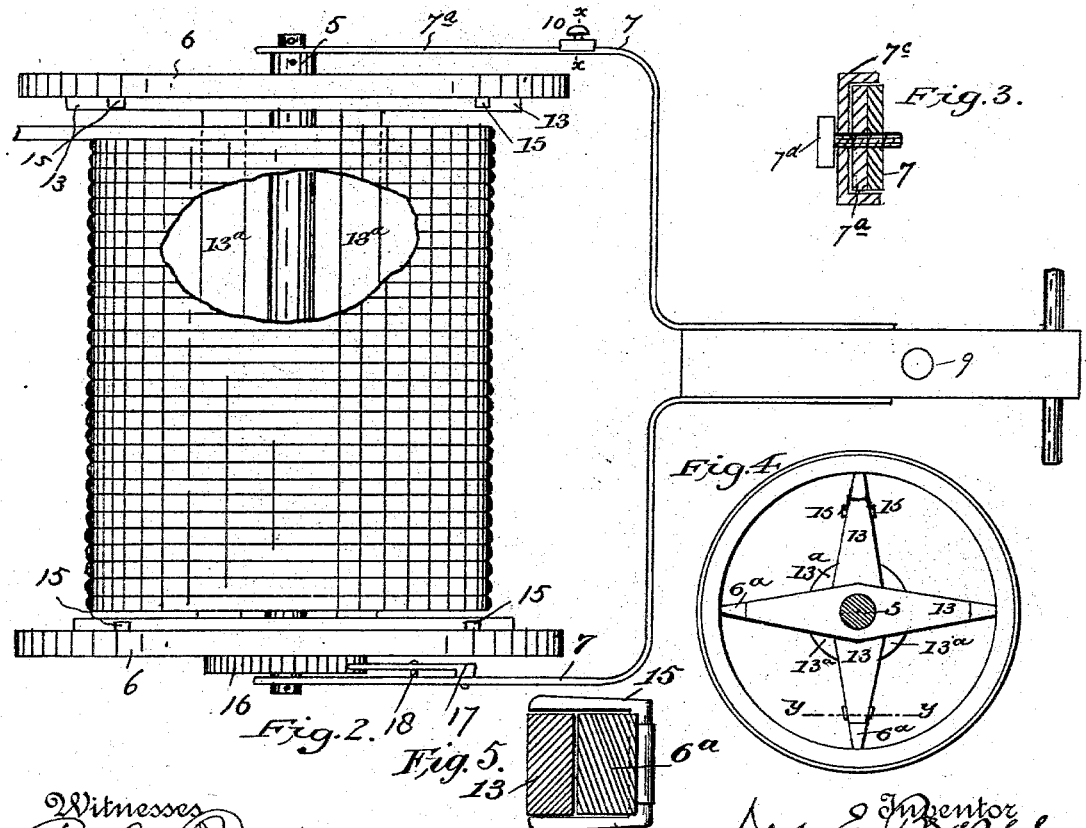

UNITED STATES PATENT OFFICE.

JOSEPH E. BRAZEE, OF DENVER, COLORADO.

WIRE STRINGER AND STRETCHER.

SPECIFICATION forming part of Letters Patent No. 511,232, dated December 19, 1893.

Application filed July 26, 1892. Serial No. 441,345. (No model.)

*To all whom it may concern:*

Be it known that I, JOSEPH E. BRAZEE, a citizen of the United States of America, residing at Denver, in the county of Arapahoe and State of Colorado, have invented certain new and useful Improvements in Wire Stringers and Stretchers; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to an improved wire stringer and stretcher for use in the construction of wire fencing and the object of the invention is to provide a device of the class stated which shall be simple in construction, economical in cost, reliable, durable and efficient in use.

To these ends the improvement consists of the features, arrangements and combinations hereinafter described and claimed, and will be fully understood by reference to the accompanying drawings in which is illustrated an embodiment thereof.

In the drawings, Figure 1 is a side view of the device; Fig. 2 a top or plan view, and Fig. 3 is a section taken on the line $x-x$, Fig. 2. Fig. 4 is a vertical section taken through the core of the spool and the axle of the cart, the end arms and the wheel being shown in elevation. Fig. 5 is a section taken on line $y-y$, Fig. 4.

Similar reference characters indicate corresponding parts or elements of the mechanism in the several views.

The numeral 5 designates a shaft or axle mounted on wheels 6 and turning therewith. To this shaft outside of the wheels is pivoted the frame composed of bars 7 which approach each other forward of the wheels where they are secured to a tongue carrying an anchoring pin 9. One of the frame-bars 7 is jointed as shown at 10 whereby the part $7^a$ between the joint and the axle may be removed from the axle and turned to any desired angle. This joint is formed by dividing the bar at a suitable point and overlapping its adjacent extremities, which are secured by clasps $7^c$ held in place by a screw $7^d$ which passes through the clamp and coinciding threaded apertures formed in the overlapping parts. The object of this adjustment of part $7^a$ of the frame is to permit the removal of one of the wheels when it is desired to remove an empty spool and replace it by a full spool of wire. The spool is of ordinary construction and adapted to slip upon the axle 5. The spokes of the wheels are provided with means for locking the spool upon the axle since when the device is used for stretching purposes this feature is indispensable. As shown in the drawings this is accomplished by providing the spokes of the wheels with hinged clasps 15, the arms of the clasp on one spoke engaging an arm 13 of the spool on either side. The core pieces connecting the ends of the spool are shown in Figs. 2 and 4 and designated $13^a$. While paying out the wire the spool is released from the locking clasp.

One extremity of the axle is provided with a ratchet wheel 16 adapted to rotate therewith. This wheel is engaged by a dog or pawl 17 pivoted on the frame. When raised from engagement with the wheel it may be supported in position by a suitable device 18 also attached to the frame.

In using my improved construction one extremity of the wire is made fast to a suitable stationary object as a post. The cart is then drawn forward and the wire unwound, the wheels of course turning in the direction indicated by the arrow $a$. When a sufficient length of the wire is unwound the tongue is dropped and pin 9 forced into the ground, making the device stationary. It will be observed that while unwinding the wire from the spool, the pawl 17 is not in engagement with the ratchet wheel. After anchoring the cart the pawl is dropped to engagement with the ratchet teeth. A person then grasps the spokes of one of the wheels and turns the spool in the direction indicated by arrow C the pawl locking the wheels in place during the operation. This is continued until the wire is made sufficiently tight, after which it is fastened to the posts and the work continued.

Having thus described my invention, what I claim is—

1. In a wire stringer and stretcher the combination with the spool, of an axle mounted upon wheels for the reception of the spool the spokes of the wheels being provided with means for locking the spool upon the axle, the frame pivoted on the axle and carrying a dog or pawl, a ratchet wheel rigidly secured to the axle and adapted to be engaged by the dog and suitable means for anchoring the frame, substantially as described.

2. In a wire stringer and stretcher the combination of an axle mounted upon wheels and turning therewith, the axle being adapted to receive the spool of wire, means attached to the spokes of the wheels for locking the spool in place thereon, a frame pivoted to the axle and terminating in a tongue provided with means for anchoring the frame, a ratchet wheel rigidly secured on the axle, and a pawl pivoted on the frame, substantially as described.

3. The combination with the axle mounted upon the wheels and adapted to receive a spool of wire, the spokes of the wheels being provided with means for locking the spool upon the axle, of a frame pivoted on the axle, one side of the frame being jointed for convenience in removing the spool, the axle being provided with a ratchet wheel and the frame carrying a pawl or dog, and means for anchoring the frame whereby the movement of the wheels may be reversed for the purpose of stretching the wire, substantially as described.

In testimony whereof I affix my signature in presence of two witnesses.

JOSEPH E. BRAZEE.

Witnesses:
WM. MCCONNELL,
D. C. FUNCHEON.